United States Patent [19]

Shuttleworth

[11] 4,067,428

[45] Jan. 10, 1978

[54] MULTIPLE-ROLLER CONVEYOR

[75] Inventor: Howard P. Shuttleworth, Warren, Ind.

[73] Assignee: Shuttleworth, Inc., Huntington, Ind.

[21] Appl. No.: 709,654

[22] Filed: July 29, 1976

[51] Int. Cl.² .............................................. B65G 13/00
[52] U.S. Cl. ..................... 193/35 R; 198/861
[58] Field of Search ............ 198/780, 861; 193/35 R, 193/37, 35 C, 35 F, 35 A

[56] References Cited

U.S. PATENT DOCUMENTS

| 2,563,965 | 8/1951 | Seed | 193/35 R X |
|---|---|---|---|
| 2,600,747 | 6/1952 | Faust | 193/35 R X |
| 3,209,879 | 10/1965 | Wahl | 193/35 C |
| 3,344,903 | 10/1967 | Holm | 193/37 X |
| 3,368,658 | 2/1968 | Eastham | 193/35 A |
| 3,840,102 | 10/1974 | Dawson | 193/35 R |

FOREIGN PATENT DOCUMENTS

| 18,521 | 9/1908 | United Kingdom | 193/37 |
|---|---|---|---|
| 1,129,259 | 10/1968 | United Kingdom | 193/35 R |

Primary Examiner—Evon C. Blunk
Assistant Examiner—James L. Rowland
Attorney, Agent, or Firm—Woodard, Weikart, Emhardt & Naughton

[57] ABSTRACT

An improved multiple-roller conveyor having a support for objects located between adjacent shafts. The support snaps onto the shafts between rollers mounted upon the shafts. The support extends between the shafts and extends upwardly less than the rollers mounted on the shafts. Small objects being conveyed along the tops of the rollers may fall over due to the spaces between the tops of adjacent rollers. The support prevents the bottoms of the objects from dipping too much into the spaces between the rollers, and thereby keeps the objects from falling over.

7 Claims, 7 Drawing Figures

MULTIPLE-ROLLER CONVEYOR

BACKGROUND OF THE INVENTION

1. Field of the Invention

This invention is in the field of multiple-roller conveyors providing support for objects between adjacent shafts.

2. Description of the Prior Art

Conveyors are employed in various fields to transport objects along a pathway or over a distance. These conveyors typically comprise one of two types, the belt conveyor and the roller conveyor. In the first type, the conveyor includes a continuous belt which extends over rotatable rollers. The rollers are driven by a motor to move the belt and to transport the objects which are supported thereon. The second type of conveyor incorporates rollers which are rotatably mounted on a shaft, the transported objects resting directly upon the rollers. The rollers either depend upon the force of gravity acting on the objects to move the objects down the conveyor line, or the rollers are positively driven by a motor.

For roller conveyors, the transported objects are supported on a discontinuous surface area defined by the tops of the rotatable rollers. The rollers therefore must carry the weight of the objects and must keep the objects balanced and upright. The base of each object should rest on a plurality of rollers on a shaft and on rollers on a plurality of adjacent shafts to be sufficiently supported to remain upright. The spacing between the shafts therefore is critical with respect to the size of the transported objects.

The spacing between shafts having large rollers is necessarily greater than for shafts having small rollers. As a result, there is generally a limitation on the maximum size of rollers which may be utilized for transporting a given object. If the rollers are too large, the distance between the tops of the rollers on adjacent shafts may be so great as to result in the objects falling over from lack of balanced support. As a general rule, the shortest lateral dimension of the base of the transported object should not be less than twice the distance between the tops of rollers on adjacent shafts. This would provide for the transported objects being supported by rollers on at least two adjacent shafts at any given time along the conveyor. It is preferable, however, that the shortest dimension of the base of the object be not less than three times the distance between the tops of rollers on adjacent shafts, in order to ensure the smooth, continuous flow of the objects along the conveyor.

As a result of the above-described limitations, the multiple-roller conveyors having large rollers have not previously been adaptable to transportation of small objects. An operation which utilizes a conveyor having large rollers may be temporarily or permanently abandoned. It may then be desirous to use that conveyor, in order to conserve money, in a new or different operation. In light of the size restrictions noted above, the large roller conveyor could not previously be used to transport items which were too small in relation to the size of the rollers.

A need has therefore arisen for an improved multiple-roller conveyor which would support and balance objects of a size smaller than would otherwise be possible based strictly on the size of the rollers. Such a conveyor has not been developed in the relevant prior art. In U.S. Pat. No. 2,897,953, issued to Namenyi-Katz on Aug. 4, 1959, there is disclosed a conveyor system which utilizes several parallel, co-planar shafts, each shaft having a plurality of cylindrical rollers mounted thereon. The cylindrical rollers are mounted in side-by-side relation and are mechanically driven by pressurized gas acting upon internal vanes of the rollers. U.S. Pat. No. 3,337,023, issued to Kohl et al. on Aug. 22, 1967 discloses a conveyor system which similarly has a plurality of rollers mounted upon each of several shafts. In neither of these patents, however, is there disclosed a means for supporting the transported objects other than by the tops of the rollers, and neither provides for adapting the conveyor to transport objects of a size smaller than would otherwise be possible.

In my U.S. patent application, Ser. No. 467,090, now issued as U.S. Pat. No. 3,951,255, there is also disclosed a conveyor having a plurality of rollers on each shaft. The present invention may be used with this and other multiple-roller conveyors to provide an improved conveyor which is capable of transporting objects of a size smaller than would normally be possible.

SUMMARY OF THE INVENTION

In a conveyor for moving objects, the conveyor including a shaft supported at first and second locations on the shaft, a plurality of rollers mounted on the shaft between the first and second locations in side-by-side relation, the rollers projecting upwardly from the shaft and being unobstructed to define a discontinuous surface area extending other than vertically between the first and second locations, the objects being held against the discontinuous surface area by gravity, the improvement comprising a support member associated with two of the rollers mounted on the shaft, the support member being connected to the shaft between the two associated rollers, the support member projecting radially from the shaft further than the two associated rollers, the two associated rollers projecting upwardly further than the support member.

It is an object of the present invention to provide an improved multiple-roller conveyor which is especially adapted to transporting objects having a relatively high center of gravity.

Another object of the present invention is to provide an improved multiple-roller conveyor which is especially adapted to transporting objects having relatively small or unusually-shaped bottoms.

A further object of the present invention is to provide an improved multiple-roller conveyor which, for a given size of rollers, is capable of transporting objects which are smaller than objects which would otherwise be transportable by the conveyor.

It is another object of the present invention to provide an improved multiple-roller conveyor which is capable of transporting objects having a base with a shortest dimension which is less than twice the distance between the tops of rollers on adjacent shafts.

Further objects and advantages of the present invention will become apparent from the following drawings and description of the preferred embodiment.

DESCRIPTION OF THE PREFERRED EMBODIMENT

Figure 1:
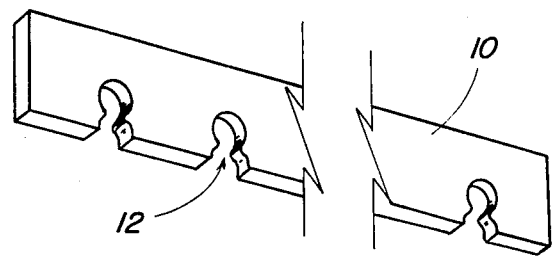
FIG. 1 is a perspective view of the support member of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The support member of the present invention is particularly applicable to and useful with a number of conveyor system designs. The primary requirement is that the conveyor for which the present support member is to be used must include a shaft which has a plurality of rollers attached to and extending above the shaft. It is not important whether the shaft upon which the rollers are mounted is stationary or rotatable.

For the purposes of description, reference will be made to the operation of the support member in conjunction with a particular conveyor system to provide an improved multiple-roller conveyor. This conveyor system is fully described in U.S. Pat. application, Ser. No. 467,090, now issued as U.S. Pat. No. 3,951,255, and the disclosure contained therein is hereby incorporated by reference. Although the support member disclosed and found in this specification is incorporated onto the particular conveyor system, it is to be understood that the present invention is not necessarily associated with or limited to that conveyor system, but can be utilized in general with multiple-roller conveyors of various types.

Figure 2:
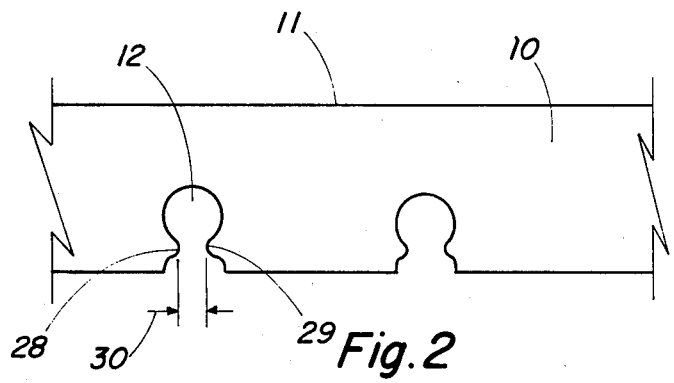
FIG. 2 is a side plan view of the support member of FIG. 1.
Figure 3:
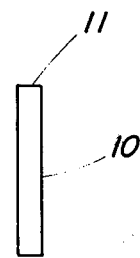
FIG. 3 is an end view of the support member of FIG. 1.

Referring in particular to FIGS. 1-3, there is shown support member 10 which is utilized by the present invention. Support member 10 includes a top edge 11 and defines partial enclosures, such as 12.

Figure 4:
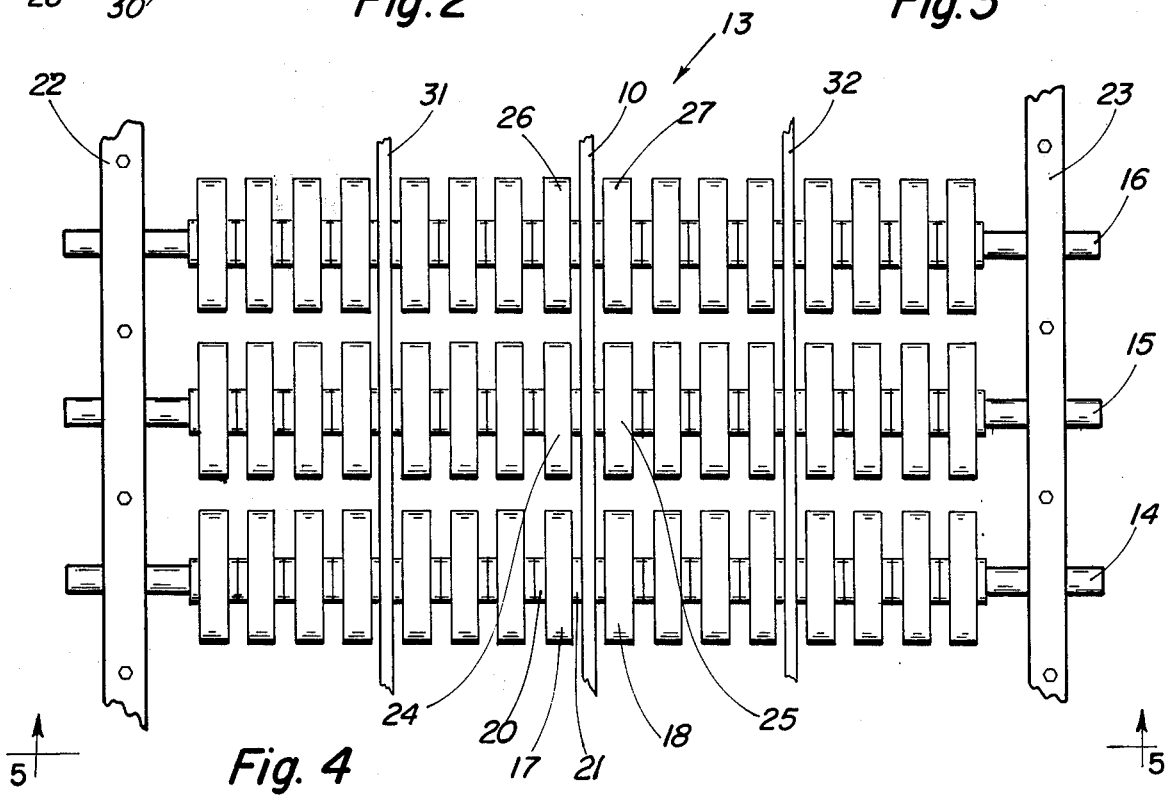
FIG. 4 is a top view of a portion of a multiple-roller conveyor in which the support member of FIG. 1 has been installed.

Support member 10 is attached to conveyor 13 (FIG. 4), which comprises parallel shafts such as 14-16. Mounted on each of the shafts are a plurality of rotatable rollers, such as 17 and 18. The tops of the rollers define a discontinuous surface area upon which the transported objects, such as 19 (FIG. 6) rest. Roller 17 includes spacers 20 and 21. The spacers are provided to separate adjacent rollers and to cause contact between adjacent rollers to occur over a limited surface area, thereby reducing interference with the separate movement of the various rollers. The inside diameter of the cylindrical rollers is made larger than the outside diameter of the corresponding, cylindrical shaft, thereby permitting the rollers to slip with respect to the shaft in the event that the rollers become jammed.

Each of the shafts 14-16 is supported near its ends by support blocks 22 and 23. Support member 10 is connected to the shafts intermediate of the support blocks 22 and 23 and between two of the rollers on each of the shafts. Support 10 (FIG. 4) is connected to shaft 14 between rollers 17 and 18, to shaft 15 between rollers 24 and 25, and to shaft 16 between rollers 26 and 27.

Figure 6:
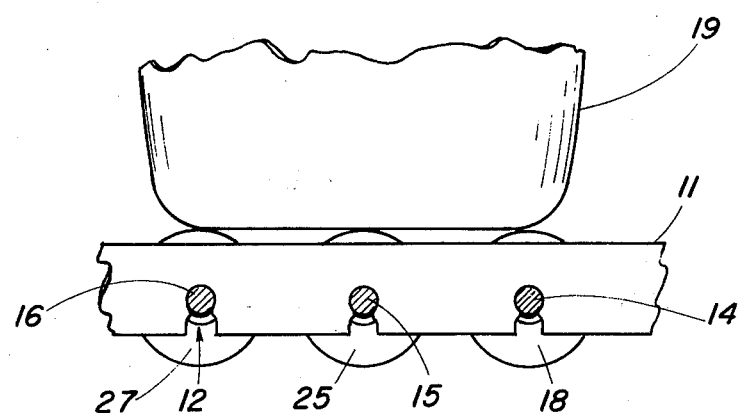
FIG. 6 is a side view of the conveyor of FIG. 5 taken along the lines 6—6 in the direction of the arrows.

Support member 10 is attached to shafts 14-16 by receiving the shafts within partial enclosures, such as 12 (FIG. 2). Shaft 16, for example, is received within partial enclosure 12 (FIG. 6). Shafts 14 and 15 are received within identical, appropriately-located partial enclosures also defined by support member 10. Detents 28 and 29 are located near the opened end of partial enclosures 12, causing the opening 30 (FIG. 2) to be narrower than the diameter of cylindrical shaft 16. As a result, when shaft 16 is positioned within the partial enclosure 12, interior of the detents 28 and 29, the shaft 16 is retained therein by the detents. Support member 10 is formed from a resilient material to permit partial enclosure 12 to be forced over the shaft 16, momentarily increasing the distance between detents 28 and 29 to permit passage of the shaft 16 therethrough. When shaft 16 is interior of detents 28 and 29, opening 30 regains its normal size and shaft 16 is thereby retained within partial enclosure 12. The purpose of the described design of the partial enclosures, such as 12, is to permit support member 10 to be readily forced or snapped onto the shafts for which it will provide the additional support for the objects. The support member may similarly be removed from the respective shafts in the reverse manner. The other partial enclosures of support member 10 are identical to partial enclosure 12 and operate in the same fashion.

The shafts 14-16 are depicted as having circular cross sections, and the partial enclosures, such as 12, are shown to be complementary-shaped. The size and shape of the shaft, however, may vary from the circular cross section shown. The portion of the partial enclosures interior of the detents may then be correspondingly varied to have a size and shape which will permit the shaft to be received and retained. It may also be desirable to vary the configuration of the interior of the partial enclosures depending upon whether or not the received shafts are rotatable. If the shafts are rotatable, the circular interior is preferred to minimize interference with the rotational movement of the shafts. On the other hand, it may be preferred to have a non-circular opening for receiving a rotatable, cylindrical shaft, in order to minimize the areas of contact between the shaft and the partial enclosure. The opening should, in any event, be slightly larger than the shaft, if the shaft is rotated.

This construction is one of the known methods for releasably connecting two members. Other known methods for releasably connecting two members are contemplated and fall within the purvue of the present invention. The disclosed structure is preferred, however, because it permits rapid, snap-on releasable connection of the support member to the shaft, while enabling the support member to be easily and inexpensively manufactured. By proper sizing of the partial enclosures and detents, the support members are easily attached to or removed from the shaft. In particular, the preferred structure described herein permits the support member to be readily adapted to existing conveyors, without the need to make any modification or to dismantle the conveyors. Also, the present design is readily adaptable to conveyors having shafts of various sizes and spacings. An inexpensive plastic material may be used to construct the support member of the present invention and will provide sufficient support strength, while being resilient enough to permit this method of attachment.

Support member 10 is shown attached to several parallel shafts. The present invention, however, also contemplates that the support member may be connected to only one shaft, or to a larger number of shafts. It is preferable that the support member be connected to several shafts since the attachment and removal of the support member is easily performed for a large number of shafts. Attachment of one support member to several shafts may be accomplished more quickly than attaching individual support members to each of the shafts. To accommodate attachment to a large number of shafts, the support member 10 is simply made the appropriate length, and the partial enclosures are positioned accordingly. If the shafts of the conveyor are not arranged in parallel manner, then the number of shafts which any one support member may be practically attached to will decrease. The support member may, however, be formed in such a configuration as to be attachable to essentially any arrangement of shafts. Where this is not practical, individual support members may be connected to each shaft.

Figure 7:
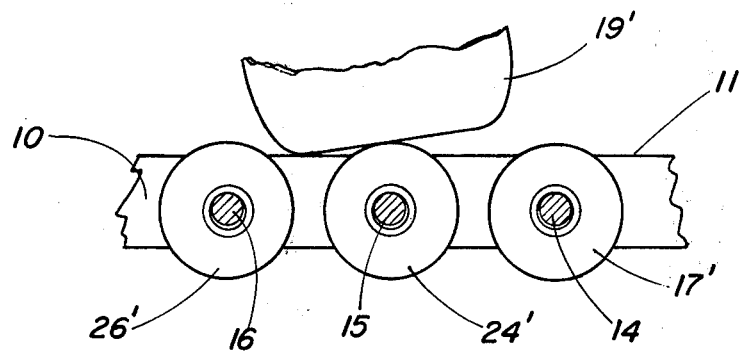
FIG. 7 is a side view of the conveyor of FIG. 5 taken along the lines 7—7.

As may be best seen in FIGS. 6 and 7, the support afforded by support member 10 is provided by top edge 11. The preferred location of top edge 11 will depend on several factors, including the size and weight of the transported object 19, the size and spacing of the rollers, and the angle of incline of the conveyor. The top edge 11 is positioned below the plane defined by the tops of the rollers on adjacent shafts so that the action of the rollers is not lost to the support member.

The role of support member 10 is not as pronounced when the base of the object 19 is at least twice as large as the distance between the rollers on adjacent shafts (FIG. 6). Even then, however, the objects, such as 19, could have a bottom edge tip into the space between adjacent rollers. The presence of the top edge 11 will prevent the object 19 from tipping sufficiently as to completely fall over. For smaller objects, such as 19', the base is not sufficiently large as to be continuously supported by at least two adjacent rollers. When the trailing edge of the base first leaves a roller, the center of gravity may not yet have moved to a point forward of the next roller, and as a result, the bottle may tip backwards, as shown in FIG. 7. The presence of the support member 10 with the top edge 11 located just below the plane of the tops of the rollers will prevent the object 19' from falling over. The driven rotation of the rollers, such as 17', 24' and 26', or the operation of gravity, will cause the object 19' to continue down the conveyor line until the center of gravity has shifted and the object 19' is again supported by at least two adjacent rollers.

Figure 5:
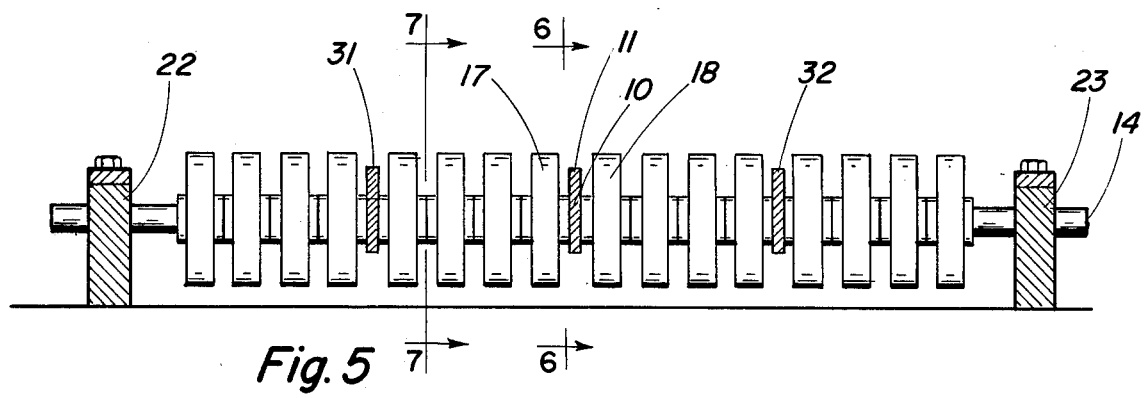
FIG. 5 is an end view of the conveyor of FIG. 4 taken along the lines 5—5 in the direction of the arrows.

In addition to support member 10, support members such as 31 and 32 may also be positioned along shaft 14 (FIG. 5), and other shafts. Support members 31 and 32 are identical to support member 10 and operate in the same manner. The total number of support members which are spaced along the length of a shaft will depend again upon the size of the bases of the transported objects. As many support members as considered necessary or desirable may be placed along the shafts in the manner shown.

While there have been described above the principles of this invention in connection with specific apparatus, it is to be clearly understood that this description is made only by way of example and not as a limitation in the scope of the invention.

The invention claimed is:

1. In a conveyor for moving objects, the conveyor including a shaft supported at first and second locations on said shaft, said shaft being unsupported between the first and second locations, a plurality of rollers mounted on said shaft between said first and second locations in side-by-side relation, said rollers projecting upwardly from said shaft and being unobstructed to define a discontinuous surface area extending other than vertically between said first and second locations, said objects being held against said discontinuous surface area by gravity, the improvement comprising:

a resilient object support member associated with two of said rollers mounted upon said shaft, said support member being connected to and supported by said shaft between said two associated rollers, said shaft being unsupported by said object support member, said support member projecting radially from said shaft further than said two associated rollers, said two associated rollers projecting upwardly further than said support member; and connecting means for releasably connecting said support member to said shaft, said connecting means comprising a partial enclosure defined by said support member thereby providing a resilient snap fit over said shaft, said shaft being received within and held by the partial enclosure.

2. The improvement of claim 1 in which the partial enclosure has an opening which is narrower than the shortest lateral dimension of the cross section of said shaft at the location at which said support member is connected thereto.

3. The improvement of claim 1 in which said conveyor includes a plurality of shafts, each shaft being supported at first and second locations on said shaft, each shaft being unsupported between the first and second locations, a plurality of rollers being associated with and mounted upon each of said shafts between said first and second locations in side-by-side relation, said rollers projecting upwardly from the associated shaft and being unobstructed to define a discontinuous surface area extending other than vertically between said first and second locations and between said plurality of shafts, said objects being held against said discontinuous surface area by gravity, said object support member being associated with and connected to each of said plurality of shafts between two of said plurality of rollers mounted on the associated shaft, said support member being supported by at least two of said plurality of shafts and said plurality of shafts being unsupported by said support member, said support member extending between adjacent shafts and being located below the planar surface area defined by the tops of said two rollers mounted on one of said adjacent shafts and the top of one of said two rollers mounted on the other of said adjacent shafts, said connecting means being for releasably connecting said support member to each of said plurality of shafts, said connecting means comprising a plurality of partial enclosures defined by said support member, each of said plurality of shafts being received within and held by an associated partial enclosure.

4. The improvement of claim 3 in which said support member comprises a flat, elongated member.

5. The improvement of claim 3 in which each of the partial enclosures has an opening which is narrower than the shortest lateral dimension of the cross section of the associated shaft at the location at which said support member is connected thereto.

6. A method for adapting a conveyor to transport objects of a size smaller than would otherwise be transportable by the conveyor, the conveyor including a plurality of shafts, each shaft being supported at first and second locations on said shaft, each shaft being unsupported between said first and second locations, a plurality of rollers being associated with and mounted upon each of said shafts between said first and second locations in side-by-side relation, said rollers projecting upwardly from the associated shaft and being unobstructed to define a discontinuous surface area extending other than vertically between said first and second locations and between said plurality of shafts, said objects to be transported by said conveyor being held against said discontinuous surface area by gravity, the method comprising:

mounting a resilient support member upon said plurality of shafts, to give a resilient snap fit thereto, said support member defining a plurality of partial enclosures, said mounting comprising moving said support member downwardly onto said plurality of shafts, to give a resilient snap fit thereto, to position each of said plurality of shafts within an associated partial enclosure, said support member when mounted upon said plurality of shafts being associated with and connected to each of said plurality of shafts between two of said plurality of rollers mounted on the associated shaft, said support member when mounted upon said plurality of shafts extending between adjacent shafts and being located below the planar surface area defined by the tops of said two rollers mounted on one of said adjacent shafts and the top of one of said two rollers mounted on the other of said adjacent shafts.

7. The method of claim 6 in which each of the partial enclosures defined by said support member has an opening which is narrower than the shortest lateral dimension of the cross section of the associated shaft at the location at which said support member is connected thereto, the method further comprising forcing said support member downwardly onto said plurality of shafts beyond the opening of each of the associated partial enclosures.

* * * * *